J. DE W. MEREDITH.
PIPE TONGS.
APPLICATION FILED JULY 12, 1913.

1,104,530.

Patented July 21, 1914.

WITNESSES

INVENTOR
JOHN D. MEREDITH,
BY
ATTORNEYS

UNITED STATES PATENT OFFICE.

JOHN DE WITT MEREDITH, OF BURKBURNETT, TEXAS.

PIPE-TONGS.

1,104,530. Specification of Letters Patent. Patented July 21, 1914.

Application filed July 12, 1913. Serial No. 778,707.

*To all whom it may concern:*

Be it known that I, JOHN D. MEREDITH, a citizen of the United States, and a resident of Burkburnett, in the county of Wichita and State of Texas, have invented a new and useful Improvement in Pipe-Tongs, of which the following is a specification.

My invention is an improvement in pipe tongs, and has for its object to provide tongs of the character specified, especially adapted for use with vertically arranged pipes, wherein flexible clasping mechanism is provided, capable of being quickly arranged to encircle the pipe or to release the same, and having gripping mechanism movable with respect to the clasping mechanism to evenly and uniformly engage the pipe.

Figure 1:
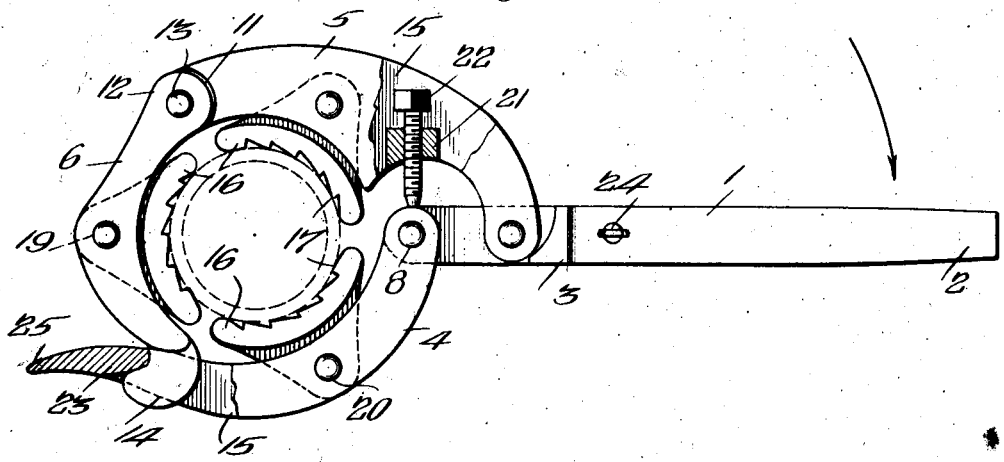
Figure 2:
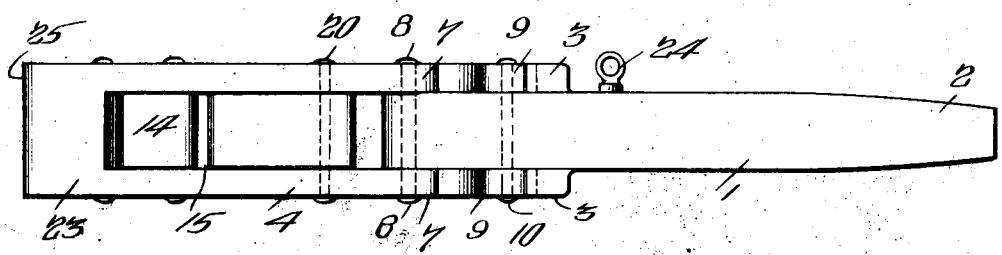
Figure 3:
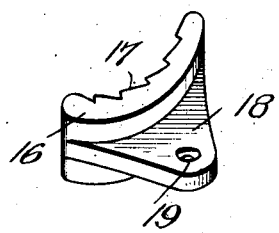

In the drawings: Figure 1 is a side view of the improved tongs with parts in section, Fig. 2 is a bottom plan view, and Fig. 3 is a detail perspective view of one of the gripping jaws.

The present embodiment of the invention comprises a handle or shank 1, having one end reduced and polygonal in cross section as shown at 2, for engagement by an extension handle, not shown, and near the opposite end the handle or shank is provided with oppositely extending stops or abutments 3.

Flexible gripping mechanism is connected with the handle or shank at the end adjacent to the abutments, the said mechanism comprising three links 4, 5 and 6. The links 4 and 5 are pivoted to the handle, and the link 6 is pivoted to the link 5, and the links 4 and 6 have interlocking mechanism to permit the flexible gripping mechanism to encircle a pipe.

The link 4 is provided at one end with laterally spaced ears or lugs 7, the said lugs being received on opposite sides of the handle or shank, and a pivot pin or rivet 8 is passed through the lugs and the end of the shank to pivotally connect the link to the shank. The link 5 is also provided with oppositely extending ears or lugs 9, and the said lugs are received upon opposite sides of the shank or handle and pivoted thereto by a rivet 10. The link 5 is pivoted to the shank or handle intermediate of the abutments 3, and the adjacent end of the handle, and the abutments are designed to engage the link to limit the swinging movement of the said link and the link 6 away from the link 4.

At its outer ends, the link 5 is reduced on each side to form a recess 11, and the link 6 is provided at its inner end with oppositely arranged ears or lugs 12, which are received in the opposite recess 11, and a pivot pin or rivet 13 is passed through the ears or lugs, and the outer end of the link 5 to pivotally connect the links 5 and 6.

At its outer end, the link 6 is provided with a hook or catch 14, for engaging the link 4, in a manner to be presently described. Each of the links 4, 5 and 6 is provided with a longitudinally extending slot or recess 15, and one of the gripping jaws shown in Fig. 3, is arranged in each recess.

Each of the jaws 16 is arc-shaped and is provided on its concave face with a series of transversely arranged ratchet teeth 17, the said teeth facing in the same direction. It will be noted from an inspection of Figs. 1 and 3, that each of the teeth 17 has a wall approximately perpendicular to the jaw, and a wall inclined or approximately parallel with the face of the jaw. Each jaw is provided on its convex face with a lug 18, the said lug being triangular in shape, and extending longitudinally of the jaw, from end to end of the convex face. Each lug is provided at its apex with an opening 19, for a purpose to be presently described.

Each of the links 4, 5 and 6 is arc-shaped or curved longitudinally, and the links are arranged with their concave sides or faces inwardly. The jaws 16 are arranged on the inner or concave sides of the links, with the lug 18 of the jaw extending into the slot or recess 15 of the link, and a pivot pin 20 is passed through the link and the opening 19 of the lug to pivotally connect the jaw to the link.

The jaws are so arranged with respect to each other that the teeth 17 all face in the same direction. The hook 14 of the link 6 is adapted to engage the outer end of the slot or recess 15 of the link 4, as shown in Fig. 5, to lock the links in position on the pipe. The link 5 is provided in the recess or slot 15 with a transverse bar 21, and a set screw 22 is threaded through the bar, the inner end of the set screw engaging the inner end of the handle or shank 1.

In use, the tongs or wrench is engaged with the pipe as shown in Fig. 1, the links 5 and 6 passing around the pipe in one direction and the link 4 in the other. The hook 14 of the link 6 is engaged with the outer end 23 of the slot or recess 15 of the link 4 to hold the links in adjusted position. It will be evident that when the screw is turned with the inner end thereof in engagement with the handle 1, the link 5 will be forced away from the handle to cause the links 4 and 6 to approach the pipe. To turn the pipe, the handle is vibrated or swung in the direction of the arrow in Fig. 1. When the handle moves in the direction the arrow points, the gripping jaws will engage the pipe closely, while when the handle or grip is moved in the opposite direction, the teeth of the jaws will slip idly over the pipe to permit the tongs to secure a new grasp. The link 4 is provided with a curved extension 25 at its outer end, the said extension forming a finger piece for moving the link to permit the engagement and disengagement of the hook 14 of the link 6. The improved tongs is especially adapted for use in placing pipe or casing in oil wells, or in any other situation where the pipe is vertical. The gripping mechanism will neither crush the pipe nor slip, and the clasping mechanism may be quickly placed or removed.

The improved tongs are manufactured in sizes, one size for each size of pipe, and they will preferably be made of forged steel. On this account, the tongs will be of considerable weight and an eye bolt 24 is provided at one side of the handle for convenience in swinging the handle.

In use, since the gripping jaws are pivoted to the links, the tongs will adjust itself closely to the pipe, and there will be a uniform strain on all of the pivot pins 20. The set screw 22 is used to prevent the jaws crushing the pipe. During the placing of the links around the pipe, the screw is loosened, and when the links have been placed, the screw is tightened to cause the jaws to grip the pipe. The object of the set screw 22 is to prevent the tongs from crushing the pipe. Before the tongs are gripped on the pipe, the screw is turned so that the flexible jaws will grasp the pipe firmly. When the handle is moved in a direction to cause the jaws to grip the pipe, the chains or links close against the set screw, and when the said links or chains engage the set screw, they are checked in their movement toward the pipe.

I claim:—

1. Pipe tongs comprising a handle, an arc-shaped link pivoted to one end of the handle, a second arc-shaped link pivoted to the handle on the inner side of the first-named link and adjacent to the connection of the said link, a third arc-shaped link pivoted to the outer end of the last-named link, said links being arranged with their concave sides inwardly, each of the said links having a longitudinal slot or recess extending through the link, the last-named link having a hook at its free end for engaging the outer end of the recess of the first-named link to lock the links in position around a pipe, and a gripping jaw in connection with each link, each jaw being arc-shaped to fit the concave face of the link and each of the said jaws having a longitudinally extending lug on its concave face engaging the recess of the adjacent link, a pivot pin passing through the link and the lug for pivotally connecting the jaw to the link, and means for tightening the links on the pipe.

2. Pipe tongs, comprising a handle, a link pivoted to the handle at one end, a series of links pivoted to the handle near the said end and extending in the opposite direction from the first-named link, means in connection with the free ends of the links for connecting the said free ends, and a set screw threaded through the link of the series adjacent to the handle and engaging the said handle adjacent to the connection of the first-named link for adjusting the links on the pipe.

3. Pipe tongs, comprising a handle, a link pivoted to the handle at one end, a series of links pivoted to the handle near the said end and extending in the opposite direction from the first-named link, means in connection with the free ends of the links for connecting the said free ends, and means in connection with the link of the series adjacent to the handle and adjustable with respect thereto, and engaging the handle to tighten the links on the pipe.

4. Pipe tongs, comprising a rigid handle, a flexible member for embracing a pipe having one end pivoted to one end of the handle, and having the other end pivoted to the handle adjacent to the said end and spaced apart therefrom and provided intermediate its ends with a releasable connection, and means in connection with the last-named end of the flexible member and adjustable with respect thereto for engaging the adjacent end of the handle for the purpose specified.

JOHN DE WITT MEREDITH.

Witnesses:
W. J. JOHNSON,
E. L. MACEY.